(12) United States Patent
Cerciello

(10) Patent No.: US 8,104,422 B2
(45) Date of Patent: Jan. 31, 2012

(54) ADHESIVE TAKE-UP, METERING AND SPREADING UNIT, IN PARTICULAR FOR BONDING MACHINES

(75) Inventor: Antonio Cerciello, Piacenza (IT)

(73) Assignee: Nordmeccanica S.p.A., Piacenza (IT)

( * ) Notice: Subject to any disclaimer, the term of this patent is extended or adjusted under 35 U.S.C. 154(b) by 791 days.

(21) Appl. No.: 11/972,641

(22) Filed: Jan. 11, 2008

(65) Prior Publication Data

US 2008/0173235 A1 Jul. 24, 2008

(30) Foreign Application Priority Data

Jan. 19, 2007 (IT) .............................. PC2007A0001

(51) Int. Cl.
*B05C 1/06* (2006.01)
*B05D 5/00* (2006.01)
(52) U.S. Cl. .................................. 118/258; 427/428.07
(58) Field of Classification Search .................. 156/324; 118/244, 246, 255, 258; 427/428.07
See application file for complete search history.

(56) References Cited

U.S. PATENT DOCUMENTS

| 1,856,823 | A | * | 5/1932 | Aivaz | 156/516 |
| 3,006,275 | A | * | 10/1961 | Allen | 101/157 |
| 3,607,813 | A | * | 9/1971 | Purcell et al. | 524/88 |
| 4,729,309 | A | * | 3/1988 | Saterini et al. | 101/152 |
| 4,786,532 | A | | 11/1988 | Brown et al. | |
| 5,213,037 | A | | 5/1993 | Leopardi, II | |
| 5,743,964 | A | * | 4/1998 | Pankake | 118/712 |
| 2003/0059717 | A1 | * | 3/2003 | Tabuchi et al. | 430/302 |
| 2007/0000607 | A1 | * | 1/2007 | Cerciello | 156/324 |
| 2009/0020028 | A1 | | 1/2009 | Christel et al. | |

FOREIGN PATENT DOCUMENTS

| EP | 1285753 A1 | 2/2003 |
| JP | 1077543 A | 3/1989 |
| WO | 2006/111556 A2 | 10/2006 |

OTHER PUBLICATIONS

European Search Report in Corresponding Application No. EP 08 00 0627 Dated Nov. 9, 2009.

* cited by examiner

*Primary Examiner* — Dah-Wei Yuan
*Assistant Examiner* — Charles Capozzi
(74) *Attorney, Agent, or Firm* — Young & Thompson

(57) ABSTRACT

An adhesive take-up, metering and spreading unit, for bonding machines is truck-mounted so that it can be replaced without having to interrupt the operation of the plant, includes a plurality of rollers arranged in series, wherein a first rubber-clad roller takes up adhesive from a reservoir and transfers it to an anilox roller, from which the adhesive is taken up by a second rubber-clad roller, which transfers it to a film to be bonded. Each roller rotates at a higher speed than the preceding one, and the unit is fitted with members that regulate the distance between the rollers, and consequently the pressure that each rubber-clad roller exerts on the anilox roller, in order to meter the precise quantity of adhesive taken up and spread on the film. This characteristic allows even special adhesives, whose application is particularly difficult due to their viscosity characteristics, to be precisely spread and metered.

9 Claims, 4 Drawing Sheets

ADHESIVE TAKE-UP, METERING AND SPREADING UNIT, IN PARTICULAR FOR BONDING MACHINES

This invention relates to an adhesive take-up, metering and spreading unit, designed in particular to be associated with bonding machines or the like of the type used to bond, for example, two plastic films, or one plastic film with a support consisting of paper, metal foil or the like.

The unit according to the invention, which is truck-mounted so that it can easily be replaced, for example to allow maintenance operations, to change the type of adhesive, etc., without having to interrupt the operation of the plant, comprises a plurality of rollers arranged in series, wherein a first rubber-clad roller takes up adhesive from a reservoir and transfers it to an anilox roller, in particular a metal roller, from which the adhesive is taken up by a second rubber-clad roller, which transfers it to the film to be bonded or to other downstream rollers.

Each roller rotates at a higher speed than the preceding one, and the unit is fitted with means that micrometrically regulate the distance between the rollers, and consequently the pressure that each rubber-clad roller exerts on the anilox roller, in order to meter the precise quantity of adhesive taken up and spread on the film.

This characteristic allows even special adhesives, such as silicone adhesives, whose application is particularly difficult due to their viscosity characteristics, to be precisely spread and metered.

The invention relates to the sector of machines used to bond two films, paid out from two reels, which are joined with adhesive spread on the surface of one of them.

The latest manufacturing machinery uses solvent-free adhesives, which offer considerable advantages in environmental terms but involve numerous difficulties, in particular as regards the spreading operation.

These high-viscosity adhesives must be applied in small quantities (approx. 1-2 grams per square metre) to a film that advances at the rate of 3-5 metres per second, and must be spread with extreme evenness and precision to prevent the formation of bubbles or other visible defects on the surface of the bonded film.

Machines of this type are known, for example, from European patent no. 0,324,892 filed by the same applicant.

In many cases, adhesive-spreading systems are truck-mounted so that they can be removed rapidly, for example for maintenance operations, or to change over rapidly from one type of adhesive to another, without having to shut down the plant for a long time.

Said spreading units generally comprise a steel roller that takes up the adhesive from a reservoir, and an intermediate rubber-clad roller that rotates at a higher speed than the preceding one, from which it receives the adhesive; the adhesive is then transferred to a third roller, made of steel, which rotates at an even higher speed and applies the layer of adhesive, by now much thinner, to the film to be bonded.

A spreading unit of this type is known, for example, from patent application EP 1,710,019 filed by the same applicant.

Developments in adhesive technology have recently led to the manufacture of silicone adhesives, which offer numerous advantages such as a shorter crosslinking time, but are difficult to meter and spread, especially in the case of high-viscosity adhesives, which are consequently difficult to use with the equipment currently known.

This problem has now been solved by the present invention, which offers a metering and spreading unit designed to be associated with bonding machines, wherein the intermediate roller is an anilox roller, made of steel or other suitable metal, which rotates in contact with a pair of rubber-clad rollers. The first of said rubber-clad rollers takes up the adhesive from a reservoir and transfers it to the anilox roller, from which it is taken up by the second rubber-clad roller, and spread on the film that runs between said rubber-clad roller and a counter-roller, preferably made of metal.

Systems are installed which allow micrometric regulation of the mutual positions of the rollers, and consequently of the pressure that each rubber-clad roller exerts on the anilox roller, thus allowing precise metering of the quantity of adhesive spread on the film, as will be seen below.

This invention will now be described in detail, by way of example but not of limitation, by reference to the annexed drawings wherein:

FIG. 1 schematically illustrates a bonding machine associated with a metering and spreading unit according to the invention:

Figure 1:
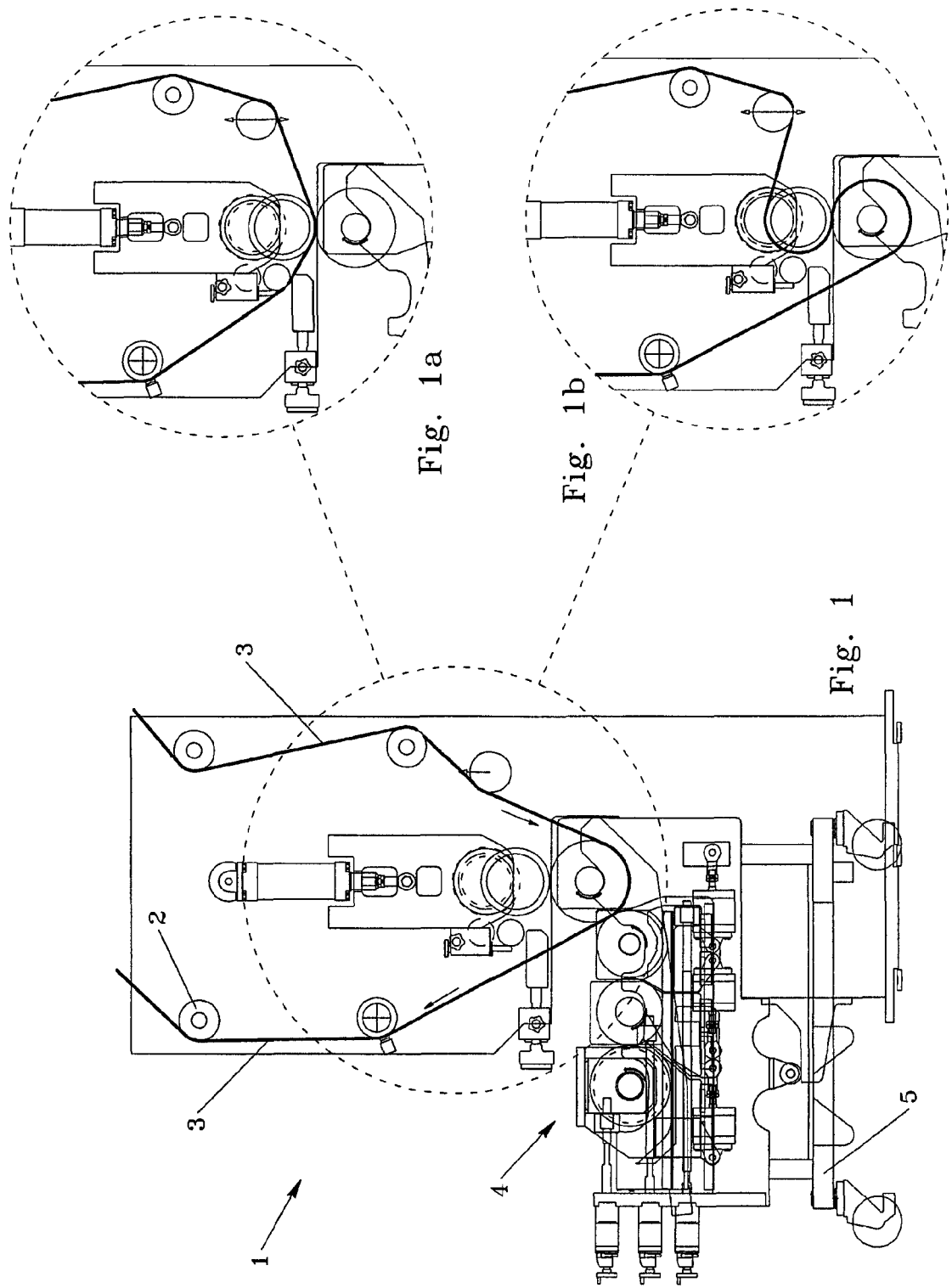

In FIG. 1, no. 1 indicates the abutments of a bonding machine (only part of which is illustrated in the figure) on which are mounted a plurality of rollers 2 that guide a film 3, which is to be bonded to a second film in a downstream area, not illustrated in the figures.

The film is received from a reel, not illustrated in the figure, and the bonded film is wound onto a third reel, also not illustrated.

The film can follow various routes, as shown in FIGS. 1, 1a and 1b, depending on the type of material (for example, narrow curves are unsuitable for aluminium foil) and the type and/or thickness of the layer of adhesive to be spread.

No. 4 indicates the adhesive-spreading unit, which is mounted on a truck 5 so that it can be rapidly inserted into or removed from the machine, for example for cleaning or maintenance operations, or to replace the unit when changing adhesive without having to shut down the machine, and so on.

Figure 2:
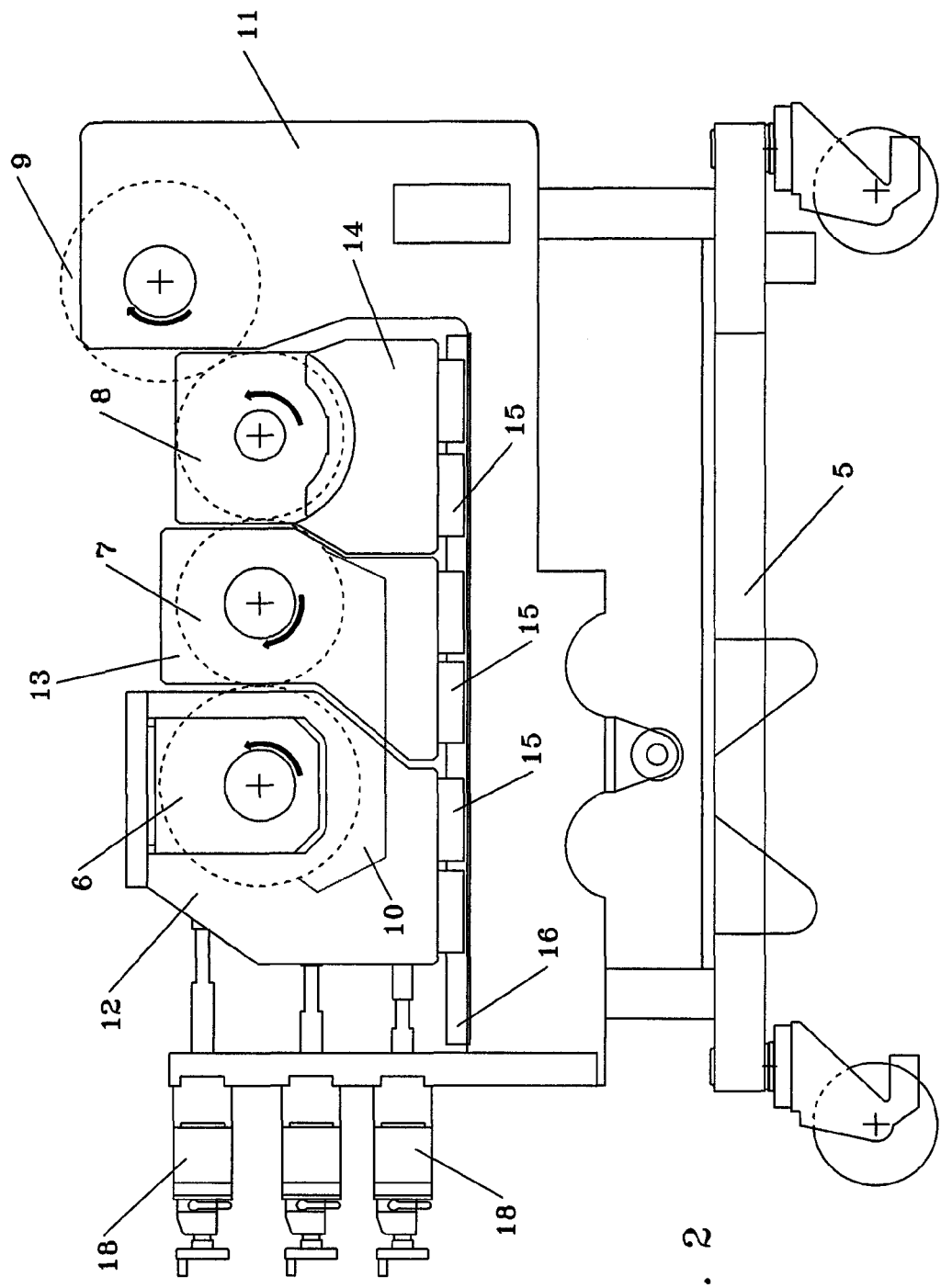
FIG. 2 is the schematic side view of the spreading unit according to the invention.

Said spreading unit, shown in FIG. 2, comprises four rollers 6, 7, 8 and 9, mounted on truck 5, which are caused to rotate around their own axis by motor means of known type which are not illustrated.

The first roller, shown as no. 6, is the take-up roller, which draws a given amount of adhesive from a tank 10.

Roller 6 is a rubber-clad roller which rotates in contact with roller 7.

Roller 7 is an anilox roller, namely a roller with a plurality of small grooves, cells, or the like on the surface, which are filled with the adhesive taken up by roller 6.

Roller 7 rotates at a higher speed than roller 6, and transfers the adhesive to the third roller 8.

Roller 8 is also a rubber-clad roller, which rotates at a higher speed than roller 7 and spreads the adhesive on the film, which passes between roller 8 and a counter-roller 9, with a fixed axis.

Roller 9 is mounted on abutments 11 of the truck, while rollers 6, 7 and 8 are mounted on first supports 12, 13 and 14 respectively.

The supports are fitted with skids 15 which slide independently along guides 16 integral with the abutments 11 of the truck.

Figure 6:
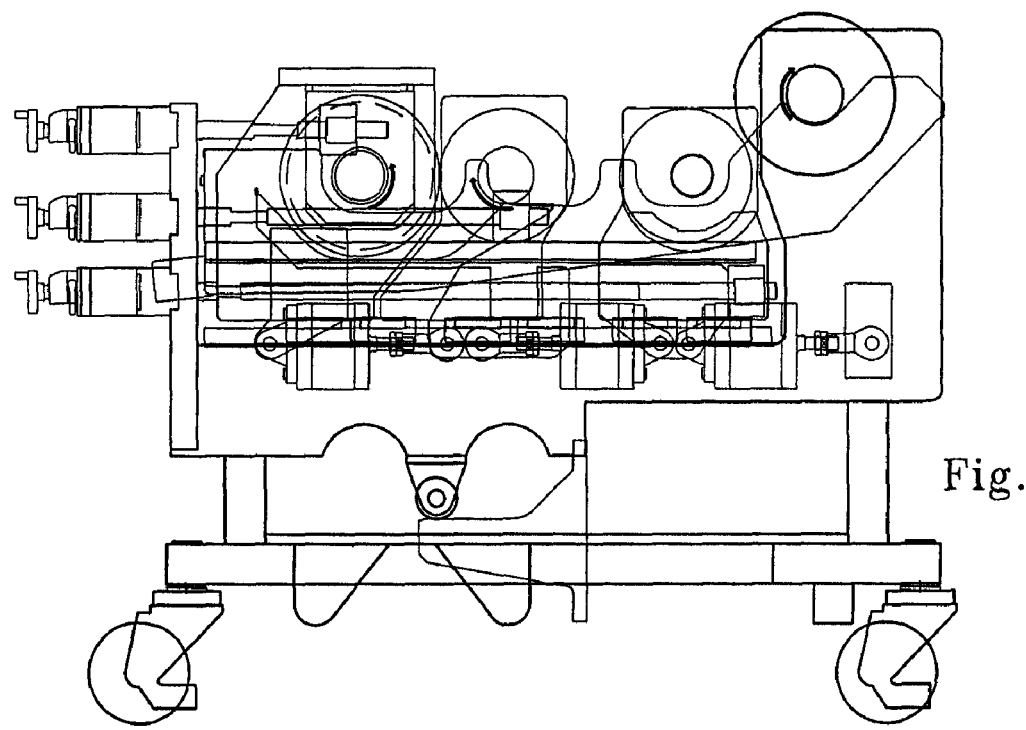

Each of said supports is subject to the action of a piston 17 (see FIG. 3), which controls its movements from an operational position in which the rollers are in contact with one another, as shown in FIG. 1, to a rest position in which the rollers are distanced from one another for replacement purposes or for maintenance or cleaning operations, as will be seen, for example, in FIG. 6.

Moreover, the position of each roller on its supports can be varied micrometrically by means of a devices 18 manually operated by a knob or similar.

This devices 18 may be, for example, a recirculating-ball shaft, a scroll and threaded-shaft device or the like, of known type.

Figure 3:
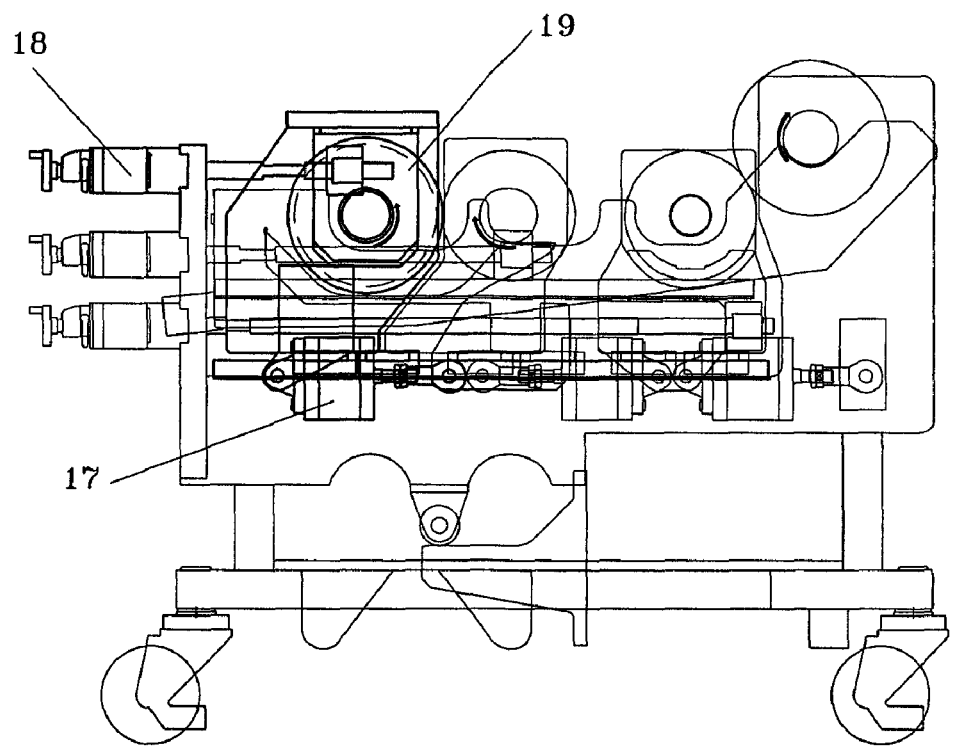
FIGS. 3 to 6 are schematic views of the unit shown in FIG. 2, showing the various positions that the rollers can adopt.
Figure 4:
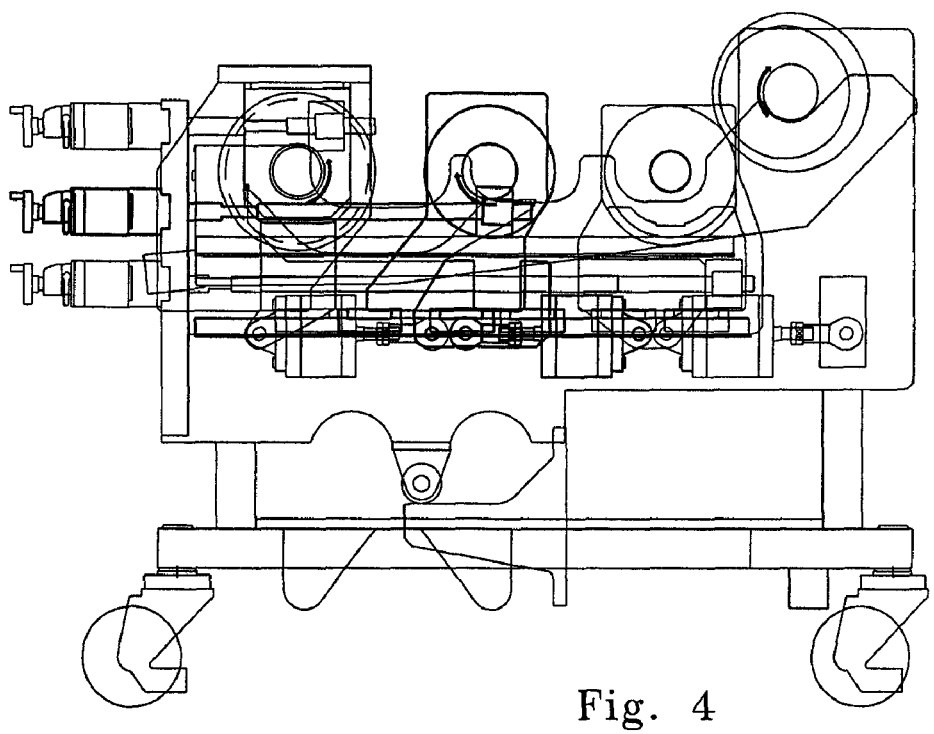
Figure 5:
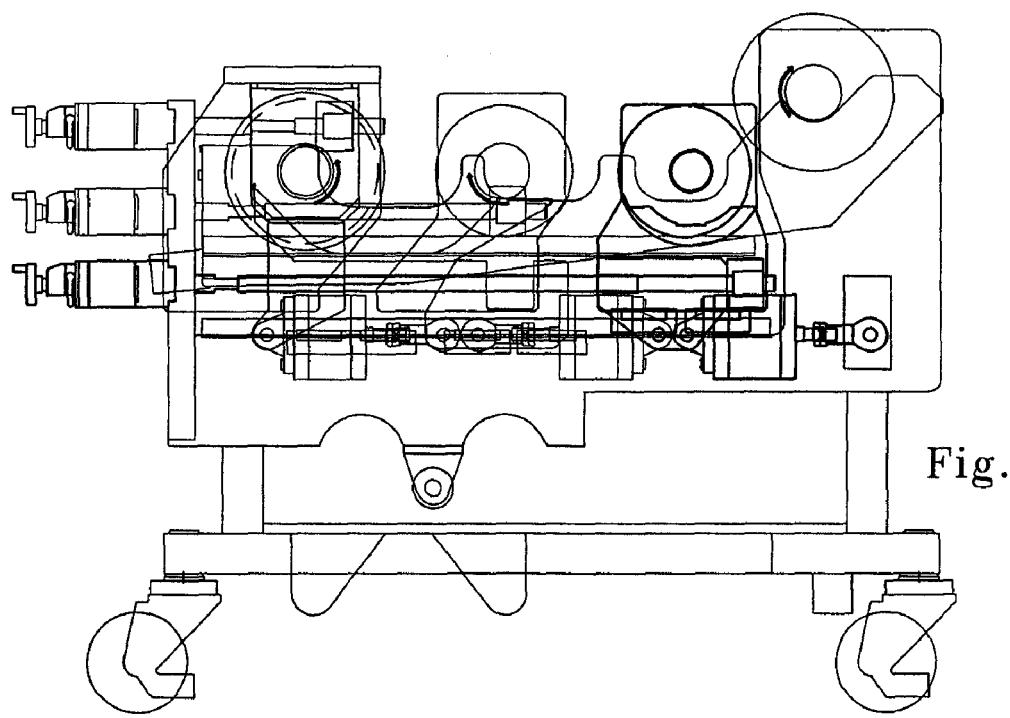

For this purpose, the shaft of each roller is mounted on the corresponding first supports by second supports, shown as no. 19 in FIG. 3, which allow limited slide, respect to the first supports, said slide being effected by operating on said second supports 19 via devices 18.

Said solution, which has proved particularly effective with high-viscosity adhesives such as silicone adhesives, operates as follows.

Roller 6, which in FIG. 2 rotates anticlockwise, takes up a certain quantity of adhesive from reservoir or tank 10, and brings it to the surface of anilox roller 7.

Here, due to the effect of the rubber layer covering roller 6, the adhesive is pushed under pressure against the cells of the roller, filling them evenly, while the excess adhesive falls into reservoir 10.

By means of regulation device 18 it is possible to adjust the position of roller 6 in relation to roller 7 micrometrically, and regulate the pressure exerted by the rubber layer on roller 7, and consequently the quantity of adhesive that fills the cells.

Roller 7, which rotates clockwise, transfers the adhesive to rubber-clad roller 8.

Once again, it is possible to regulate the amount of adhesive taken up by the rubber layer of roller 8 from the cells of roller 7, by micrometrically varying the distance between the two rollers, again by means of the corresponding device 18, and consequently varying the pressure exerted by the rubber layer on roller 7.

Roller 8 rotates at a higher speed than roller 7, thus exercising a stretching action on the adhesive, which further thins it.

The layer of adhesive is then transferred from roller 8 to the film that passes between roller 8 and counter-roller 9.

The position of roller 8 in relation to roller 9 can also be adjusted, so as to vary the pressure between the two rollers and the film that passes between them.

An expert in the field could devise various modifications and variations, all of which should be deemed to fall within the ambit of this invention.

The invention claimed is:

1. An adhesive metering and spreading unit for bonding machines, comprising:
    a first rubber-clad roller (6) that takes up an adhesive from a tank (10);
    a second roller (7) which rotates in contact with said first roller (6);
    a third rubber-clad roller (8) which rotates in contact with said second roller (7) designed to receive the adhesive from said second roller and spreads the adhesive onto a film;
    a fourth counter-roller (9) which presses the film onto the third rubber-clad roller (8), said first, second and third rollers each being supported by first supports (12, 13, 14) fitted with skids (15) independently sliding along guides (16) placed on abutments (11); and
    a means (17) being provided to move said first supports (12, 13, 14) from a rest position in which the rollers are distanced to an operational position in which the rollers are substantially in contact with one another,
    each of said first, second and third rollers being mounted on first supports (12, 13, 14) by second supports (19) with limited slide in respect to the first supports (12, 13, 14), the distance from said second supports being varied micrometrically in said operational position by micrometric devices (18) manually operated.

2. The adhesive metering and spreading unit as claimed in claim 1, wherein said micrometric device (18) for varying the distance between the rollers comprises a scroll/threaded-shaft system operating on the ends of a roller shaft which is mounted on said second support (19) to control said second support's (19) micrometric movements in relation to the first supports (12, 13, 14).

3. The adhesive metering and spreading unit, as claimed in claim 1, wherein said second roller (7) is an anilox roller.

4. The adhesive metering and spreading unit, as claimed in claim 2, wherein said second roller (7) is an anilox roller.

5. The adhesive metering and spreading unit, as claimed in claim 3, wherein said anilox roller is provided with a plurality of small grooves on the surface which are filled with the adhesive taken up by first roller (6).

6. The adhesive metering and spreading unit as claimed in claim 5, wherein said second anilox roller (7) is made of metal.

7. The adhesive metering and spreading unit as claimed in claim 1, wherein said means designed to slide said first supports from a rest position to an operational position comprise pistons (17) that act each on the first roller supports (12, 13, 14).

8. The adhesive metering and spreading unit as claimed in claim 2, wherein said means designed to slide said first supports from a rest position to an operational position comprise pistons (17) that act each on the first roller supports (12, 13, 14).

9. The adhesive metering and spreading unit as claimed in claim 3, wherein said means designed to slide said first supports from a rest position to an operational position comprise pistons (17) that act each on first roller supports (12, 13, 14).

* * * * *